June 2, 1964 A. E. KORNBLUTH ETAL 3,135,929

FREQUENCY STABILIZATION CIRCUIT FOR A KLYSTRON OSCILLATOR

Filed June 21, 1962

INVENTORS
ALLAN E. KORNBLUTH
RICHARD B. RIDDELL
BY
ATTORNEY

3,135,929
FREQUENCY STABILIZATION CIRCUIT FOR A KLYSTRON OSCILLATOR

Allan E. Kornbluth, North Massapequa, and Richard B. Riddell, Jackson Heights, N.Y., assignors, by mesne assignments, to the United States of America as represented by the Secretary of the Navy Filed June 21, 1962, Ser. No. 204,670
1 Claim. (Cl. 331—178)

The present invention relates to novel and improved electronic control circuitry and more particularly to a novel and improved automatic frequency control circuit for a klystron type oscillator.

In pulse compression radar systems a linear sweep voltage is often used to frequency modulate the R.F. carrier of a reflex klystron transmitter about a desired center frequency. In order to maintain the center frequency of the transmitter constant despite the aging of electronic components, temperature variation effects, and other unavoidable changes of component parameters of the circuit design, it is necessary to provide a suitable error correction signal that automatically compensates for such changes.

It is therefore a principal object of the present invention to provide a novel and improved frequency control system for a reflex klystron oscillator which is relatively simple in design and yet highly reliable in use.

Other objects and many of the attendant advantages of this invention will be readily appreciated as the same becomes better understood by reference to the following detailed description when considered in connection with the accompanying drawing(s) wherein.

Figure 2:
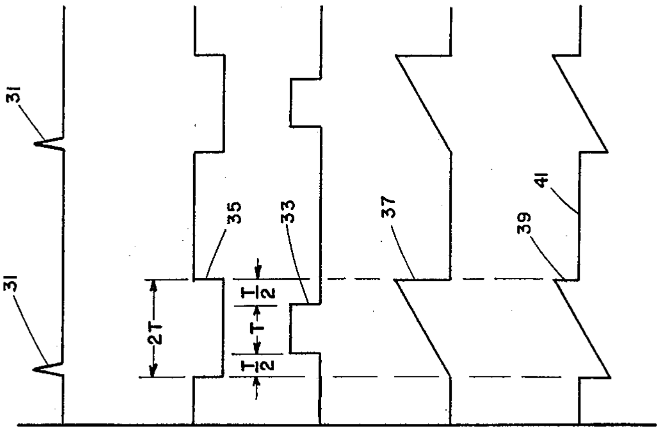
FIGURE 2 shows the time sequence of various wave forms of pulses in the embodiment of the invention shown in FIGURE 1.
Figure 1:
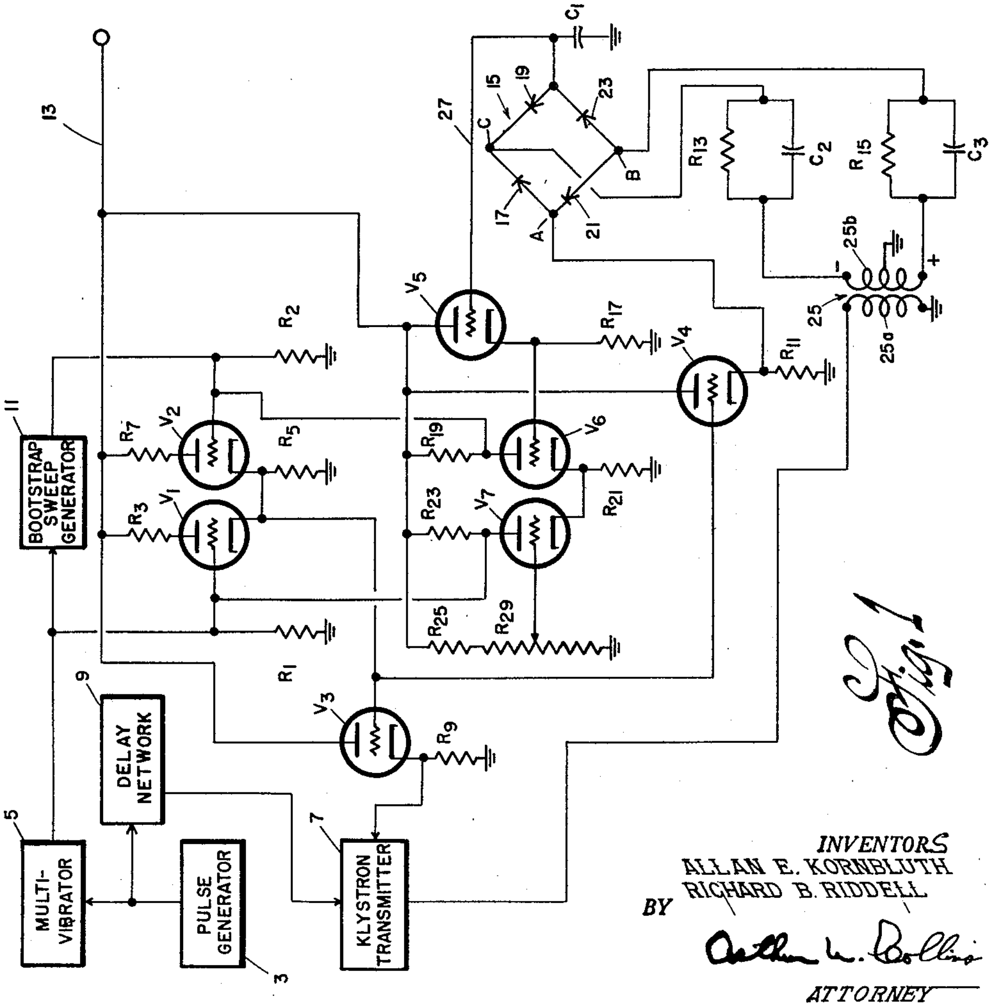
FIGURE 1 is diagrammatic view of a preferred embodiment of the present invention.

A preferred embodiment of the present invention is illustrated in FIGURE 1 of the drawing. As shown therein, the output circuit of the pulse generator 3 is coupled to the multivibrator 5 and to the klystron transmitter 7 through the delay network or the like 9. Multivibrator 5 is coupled to the control grid of triode $V_1$ and also to the control grid of triode $V_2$ through the boot strap sweep generator 11. Control grids of triodes $V_1$ and $V_2$ are respectively connected to ground through resistors $R_1$ and $R_2$. The plate circuit of triode $V_1$ extends from the positive D.C. voltage supply line 13 through resistor R–3, through the tube and through resistor R–5 to ground. The plate circuit of triode $V_2$ extends from the positive voltage supply line 13 through resistor R–7, through the tube and through resistor R–5 to ground. The junction of resistor R–5 with the cathodes of triodes $V_1$ and $V_2$ is coupled to the klystron transmitter 7 through the control grid of triode V–3 and to the control grid of triode V–4. The plate circuit of triode $V_3$ extends from the power supply line 13 through the tube $V_3$ and resistor R–9 to ground. The plate circuit of triode $V_4$ extends from power supply line 13 through the tube and resistor $R_{11}$ to ground. The cathode circuit of triode $V_4$ is coupled as shown to condenser C–1 through the boxcar detector circuit 15 which includes the oppositely poled series connected rectifier elements 17 and 19 in parallel with the oppositely poled series connected rectifier elements 21 and 23. The primary winding **25*a* of transformer 25 is coupled to the klystron transmitter 7 as shown. The center tap of the secondary winding 25*b* of transformer 25 is connected to ground. One end of the secondary winding 25*b* is connected to the junction of rectifier elements 17 and 19 through the parallel arrangement of condenser $C_2$ and resistor $R_{13}$. The other end of secondary winding 25*b* of the transformer is connected to the junction of rectifier elements 21 and 23 through the parallel arrangement of condenser $C_3$ and resistor $R_{15}$. The ungrounded terminal of condenser $C_1$ is connected to the control grid of triode $V_5$ through conductor 27. The plate circuit of triode $V_5$ extends from the power supply line 13 through the tube and resistor $R_{17}$ to ground. The cathode of triode $V_5$ is connected to the control grid of triode $V_6$. The plate circuit of triode $V_6$ extends from the power supply line 13 through resistor $R_{19}$, through the tube and through resistor $R_{21}$ to ground. The plate of triode $V_6$ is connected as shown to the control grid of triode $V_2$. The plate circuit of triode $V_7$ extends from power supply line 13 through resistor $R_{23}$, through the tube, and through resistor $R_{21}$ to ground. The control grid of triode $V_7$ is connected to the center top of potentiometer 29 which is energized by the circuit extending from the positive supply line 13 through the dropping resistor $R_{25}$ and potentiometer 29** to ground. The plate of triode $V_7$ is connected as shown to the control grid of triode $V_1$.

In operation, pulse generator 3 periodically energizes delay network 9 and multivibrator 5. Klystron transmitter 7 is therefore energized after a predetermined delay interval of the output pulse 31 of generator 3 and provides a frequency modulated output transmission pulse 33 for an interval T double that of the predetermined delay. Pulse 31 also triggers the conventional flip-flop multivibrator 5. The square wave output signal 35 of multivibrator 5 which then persists for an interval double that of the klystron transmitted pulse 33, in turn energizes the bootstrap sweep generator 11 and the control grid of triode $V_1$. Bootstrap generator 11 which is of any suitable conventional design that provides a substantially linear sawtooth or output pulse 37 equal in duration and double the amplitude of square wave pulse 35 of multivibrator 5, drives the control grid of triode $V_2$. The potential of the common cathode connection of triodes $V_1$ and $V_2$ therefore follows square wave and sawtooth voltage variations of the control grids of triodes $V_1$ and $V_2$ and produces output pulse 39. Output pulse 39 of the cathode mixer circuit of triodes $V_1$ and $V_2$ drives klystron transmitter 7 through the cathode follower circuit of triode $V_3$ and provides a linear variation of modulation of the reflector plate potential of the klystron. Variation of the reflector plate potential in turn linearly modulates the frequency of operation of the klystron about a predetermined center frequency in the desired manner.

The center freqency of the sawtooth modulated reflex klystron 7 is maintained constant by the application of an error correcting signal at the control grids of triodes $V_1$ and $V_2$. More specifically, output pulse 39 from the cathodes of triodes $V_1$ and $V_2$ is fed through the cathode follower circuit of triode $V_4$ to the junction A of rectifier elements 17 and 21 of the gated detector 15. With each pulse that is transmitted from klystron 7, transformer 25 is simultaneously energized so as to provide a positive potential at the lower terminal of secondary winding **25*b* and a negative potential at the upper terminal of secondary winding 25*b*. The periodic positive potential across the lower half of winding 25*b* tends to charge condenser $C_1$ positively through the parallel arrangement of condenser $C_3$ and resistor $R_{15}$ and through rectifier element 23. The periodic negative potential across the upper half of winding 25*b* tends to discharge condenser $C_1$ through rectifier element 19 and through the parallel arrangement of condenser $C_2$ and resistor $R_{13}$. When the potential at the junction of rectifier elements 17 and 21 is held at a predetermined value, the above described charging and discharging circuits of condenser $C_1$ offset one another and the effective potential across condenser $C_1$ remains unchanged. When, however, the potential at A of the detector 15 varies from the above described predetermined value, the effective charge or potential across condenser $C_1$ also varies. Thus, for example, when the potential at A becomes more positive less current will flow through rectifier 21 and resistor $R_{15}$, a smaller IR drop occurs across resistor $R_{15}$ and a higher positive potential at B will charge condenser $C_1$. At the same time the increased positive potential at A provides more current flow through rectifier 17 and resistor $R_{13}$, an increased IR drop occurs across resistor $R_{13}$ and a higher positive potential at C reduces the discharge current from condenser $C_1$ through rectifier 19. Similarly, when the potential at A becomes more negative, more current flows through rectifier 21 and resistor $R_{15}$, an increased IR drop occurs across resistor $R_{15}$, and a lower positive potential at B provides less charging current to condenser $C_1$ through rectifier 23. At the same time the more negative potential at A provides less current flow through rectifier 17 and resistor $R_{13}$ a reduced IR drop across resistor $R_{13}$ and a reduced potential at C that increases the discharge current from condenser $C_1$ through rectifier 19. The potential across condenser $C_1$ is then fed through the cathode follower circuit of triode $V_5$ to the control grid of triode $V_6$ where a balanced push-pull error signal is developed at the plates of triodes $V_6$ and $V_7$ to oppositely adjust the grid potentials of triodes $V_1$ and $V_2$ and ultimately modulate the reflector plate potential of the klystron 7. Thus, as the pulse 39 at the common cathode connection of triodes $V_1$ and $V_2$ varies in its sawtooth manner during the occurrence of transmitted pulse 33, the potential across condenser $C_1$ remains unchanged as long as sawtooth wave 39 crosses the preset potential 41 at the midpoint of the transmitted pulse 33. When sawtooth wave 39 crosses the preset potential 41 at any other time the potential across condenser $C_1$ changes so as to effect the grid bias level of triodes $V_1$ and $V_2$ and shift the cross over to its correct position with respect to the transmitted pulse. Potentiometer 29 coupled to the control grid of triode $V_7$ in the paraphase amplifier circuit provides ready adjustment of the bias of triodes $V_1$ and $V_2$ in order to initially set the potential 41** and balance the system.

Obviously many modifications and variations of the present invention are possible in the light of the above teachings. It is therefore to be understood that within the scope of the appended claims the invention may be practiced otherwise than as specifically described.

What is claimed is:

Automatic frequency control apparatus for a frequency modulated klystron transmitter, said apparatus comprising:

(*a*) a pulse generator;
(*b*) a multivibrator which is coupled to the generator and provides a square wave output pulse;
(*c*) a sweep generator which is coupled to the output of the multivibrator and provides a sawtooth output pulse;
(*d*) a cathode mixer energized by the square wave and the sawtooth pulse;
(*e*) means for establishing a present grid bias potential for the mixer;
(*f*) means responsive to the output pulse of the cathode mixer for providing a potential which controls the frequency of the klystron transmitter;
(*g*) a condenser;
(*h*) a charging circuit for the condenser;
(*i*) a discharge circuit for the condenser;
(*j*) means for coupling the condenser charging and discharge circuits to the output circuit of the klystron transmitter and energizing the condenser charging and discharging circuits when the klystron transmitter provides an output pulse;
(*k*) means for coupling the output pulse of the cathode mixer to the condenser charging and discharge circuits such that when the average potential of the mixer output pulse increases, the impedance of the discharge circuit increases, the impedance of the charging circuit decreases, and the potential across the condenser increases and such that when the average potential of the mixer output pulse decreases, the impedance of the discharge circuit decreases, the impedance of the charging circuit increases, and the potential across the condenser decreases;
(*l*) means responsive to changes in potential across the condenser for modifying the grid bias potential of the mixer and nulling a change in its average output potential.

References Cited in the file of this patent

UNITED STATES PATENTS

| | | |
|---|---|---|
| 2,593,330 | Mohr | Apr. 15, 1952 |
| 2,927,279 | Smith-Vaniz | Mar. 1, 1960 |
| 3,072,864 | Alexis et al. | Jan. 8, 1963 |